(12) United States Patent
Mosser et al.

(10) Patent No.: US 7,993,438 B2
(45) Date of Patent: *Aug. 9, 2011

(54) HIGH TEMPERATURE RESISTANT COATING COMPOSITIONS

(75) Inventors: Mark F. Mosser, Perkiomenville, PA (US); Kevin Eddinger, Gilbertsville, PA (US); Eileen Fox, West Reading, PA (US); Thomas F. Lewis, III, Chester Springs, PA (US)

(73) Assignee: Praxair S.T. Technology, Inc., North Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/848,285

(22) Filed: Aug. 2, 2010

(65) Prior Publication Data

US 2010/0288158 A1 Nov. 18, 2010

Related U.S. Application Data

(63) Continuation of application No. 12/057,620, filed on Mar. 28, 2008, now Pat. No. 7,789,953.

(51) Int. Cl.
 *C23F 11/00* (2006.01)
 *C23F 11/18* (2006.01)
 *C23F 15/00* (2006.01)
 *C09D 5/08* (2006.01)

(52) U.S. Cl. .............. 106/14.21; 106/14.12; 106/286.1; 106/286.2; 106/286.8; 148/253; 148/261; 252/387

(58) Field of Classification Search .............. 106/14.12, 106/14.21, 286.1, 286.2, 286.6, 286.8; 148/253, 148/261; 252/387

See application file for complete search history.

(56) References Cited

U.S. PATENT DOCUMENTS

| | | |
|---|---|---|
| 3,248,251 A | 4/1966 | Allen |
| 4,537,632 A | 8/1985 | Mosser |
| 4,544,408 A | 10/1985 | Mosser et al. |
| 4,548,646 A | 10/1985 | Mosser et al. |
| 4,617,056 A | 10/1986 | Mosser et al. |
| 4,650,699 A | 3/1987 | Mosser et al. |
| 4,659,613 A | 4/1987 | Mosser et al. |
| 4,863,516 A | 9/1989 | Mosser et al. |
| 4,889,558 A | 12/1989 | Mosser |
| 5,116,672 A | 5/1992 | Mosser et al. |
| 5,242,488 A | 9/1993 | Stetson et al. |
| 5,279,649 A | 1/1994 | Stetson et al. |
| 5,279,650 A | 1/1994 | Stetson et al. |
| 5,478,413 A | 12/1995 | Mosser et al. |
| 5,968,240 A | 10/1999 | Myers et al. |
| 6,150,033 A | 11/2000 | Mosser et al. |
| 6,224,657 B1 | 5/2001 | Myers et al. |
| 6,582,530 B1 | 6/2003 | Hanlon et al. |
| 7,789,953 B2 * | 9/2010 | Mosser et al. ............. 106/14.21 |

OTHER PUBLICATIONS

International Search Report for PCT/US2009/037960 mailed Jun. 18, 2009.

* cited by examiner

*Primary Examiner* — Anthony J Green
(74) *Attorney, Agent, or Firm* — Banner & Witcoff, Ltd.

(57) ABSTRACT

An aqueous phosphoric bonding solution consists essentially of phosphoric acid, a source of magnesium ions, and a leachable corrosion inhibitor. The bonding solution is stable with respect to inorganic metal particles, such as aluminum, which are admixed to the bonding solution for the preparation of a coating slurry. Metal parts coated with the coating compositions have very satisfactory properties such as heat and corrosion resistance.

15 Claims, No Drawings

HIGH TEMPERATURE RESISTANT COATING COMPOSITIONS

This is a continuation of U.S. application Ser. No. 12/057,620, filed Mar. 28, 2008, now U.S. Pat. No. 7,789,953, the disclosure of which is hereby incorporated by reference.

BACKGROUND

Compositions comprising phosphoric acid and aluminum metal are well known for use in protecting metallic surfaces such as ferrous surfaces from corrosion. In such coating compositions, particulate metallic material, such as aluminum flake and/or powder, is combined with a phosphoric acid bonding solution to form a coating composition which is then applied to the metallic surface being treated. After application of the coating to the substrate, it may be heated to a first temperature, generally upwards of 500° F. (260° C.), until the coating is rendered essentially water insoluble. Then the coated surface may be cured at a second temperature, generally above 1000° F. (538° C.) to form the final protective coating.

A problem which arises in this coating process is that when the particulate metallic material is combined with the phosphoric acid bonding solution, the acidic bonding solution can react with the metallic material. Such reactions can be very violent, causing the flake and/or powder to burn or even explode, or less violent, simply resulting in the conversion of the metallic material into various salts. In either case, such reactions interfere with the formation of suitable protective coatings.

Allen U.S. Pat. No. 3,248,251 describes coating compositions consisting essentially of a slurry of solid inorganic particulate material (such as aluminum) in an aqueous acidic bonding solution containing dissolved metal chromate, dichromate or molybdate, and phosphate. It was found that the addition of chromates or molybdates to the acidic bonding solution effectively passivated the solution toward aluminum and inhibited the oxidation of metallic aluminum, allowing particulate aluminum to be combined with the bonding solution without the undesirable chemical reaction between the acidic solution and the aluminum. These so-called Allen coatings have been successfully used to provide high quality coatings which protect ferrous metal alloy surfaces from oxidation and corrosion, particularly at high temperatures.

While chromates and molybdates have been used successfully to reduce the reactivity of the aluminum in such coating compositions, the use of chromates and molybdates has become a problem because of environmental considerations. Chromates and molybdates are generally considered to be toxic substances. Hexavalent chromium is rated as a carcinogen. It is therefore desirable to avoid the use of solutions of such salts, or at least to reduce their use. For this reason, it has become desirable to develop a phosphate/aluminum coating composition which requires little or no chromates or molybdates to control the reactivity between the acidic phosphate bonding solution and the particulate aluminum added thereto. The coating compositions should protect ferrous metal alloy surfaces from the oxidation and corrosive environmental conditions, especially at high temperatures, at least as well as the Allen-type coatings.

Some efforts have been made to overcome the environmental problem associated with chromates and molybdates. Stetson et al. U.S. Pat. No. 5,242,488 describes a coating composition for ferrous alloys which does not require either chromates or molybdates to control the reaction between the bonding solution and the powdered aluminum. The composition consists essentially of a slurry mixture of a bonding solution and aluminum powder. The bonding solution consists essentially of water, phosphoric acid ($H_3PO_4$), and aluminum ions in solution in an amount sufficient to substantially equilibrate the bonding solution with respect to aluminum metal pigment. The bonding solution component of the coating composition requires sufficient aluminum ions in solution so that it is substantially equilibrated with respect to aluminum metal pigment, i.e., that the amount of aluminum ions in solution be substantially at the saturation point and therefore, essentially inert with respect to any subsequent addition of aluminum metal pigment.

Stetson discloses using magnesium (either MgO or $MgCO_3$) to at least partially neutralize the aqueous phosphoric acid mixture, either before or after equilibration of the mixture with aluminum. A more recent patent to Stetson et al., U.S. Pat. No. 5,279,649, describes substantially the same compositions to which $V_2O_5$ has been added to produce vanadate ion, adding another inhibitor to the aluminum equilibrated mixture. Further, Stetson et al. U.S. Pat. No. 5,279,650 discloses a seal coating composition of the coating disclosed in the '649 patent which also contains iron oxide ($Fe_2O_3$) powder. All three coating compositions are designed to avoid the use of the chromium and molybdenum ions and require the bonding solution to be equilibrated with respect to further additions of aluminum. The addition of $V_2O_5$ demonstrates the addition of a toxic substance, listed on the OSHA extremely hazardous substance list.

Environmentally friendly coating compositions are described in commonly assigned Mosser et al. U.S. Pat. No. 5,478,413, which discloses an aqueous solution of phosphoric acid, one or more sources of magnesium ions, and a source of aluminum ions and/or sources of zinc and borate ions. The amount of aluminum in solution is in an amount less than that necessary to reach the saturation point, thus, less than the amount necessary to equilibrate the bonding solution with respect to additional aluminum. The bonding solutions are non-reactive with respect to particulate aluminum for at least one hour.

SUMMARY

In one aspect, a bonding solution for use in forming a ferrous alloy coating composition consists essentially of phosphoric acid, a source of magnesium ions, and a leachable corrosion inhibitor. The bonding solution has a pH in the range of about 2 to about 4.5, usually from about 2.5 to about 3.5, and often from about 2.7 to about 3.3. To obtain the desired pH, additional amounts of acid or base may be added to the composition as needed. To lower pH, for example, a water-soluble phosphoric acid or acid salt such as magnesium dihydrogen phosphate may be added.

In another aspect, a coating composition comprises the bonding solution and particulate metallic material such as aluminum. The particulate metallic material may be of any suitable form, such as powder, flake, or a combination of powder and flake.

In another aspect, a method of protecting a substrate comprises applying the coating composition to a metal surface of the substrate, and heating the coated substrate to cure the coating composition.

The bonding and coating compositions usually are free or substantially free of chromium, especially hexavalent chromium and molybdate and other toxic metals, like nickel and vanadium. Though free or substantially free of such objectionable metals, the compositions are stable for periods of time adequate to apply the coating, especially for periods exceeding 1 hour, usually more than 4 and often more than 8 hours. Some compositions are stable for several days and remain liquid for many weeks.

The coatings are very satisfactory, in general meeting or exceeding the standards of the Allen coatings in terms of resistance to oxidation and corrosion, especially at high temperature. The bonding and coating compositions exhibit such stability and performance characteristics without the need for adding sources of zinc ions and/or aluminum ions as described in U.S. Pat. No. 5,478,413, thus simplifying the compositions and their manufacture. The coatings are especially well suited for turbine compressor airfoils, like blades, vanes, stators, and the like.

The bonding solution may be prepared by first preparing a binder solution by combining water, phosphoric acid, a source of magnesium ions, and optionally a source of borate ions. The leachable corrosion inhibitor may then be added to the buffered binder solution to prepare the bonding solution. The leachable corrosion inhibitor and/or other components of the bonding solution may have low or reduced solubility or miscibility in water or in the aqueous phosphoric acid. Such less soluble or miscible components may be present in emulsion or other non-solution form. Such terms used herein as "aqueous bonding solution" and "bonding solution" are thus intended to include compositions in which one or more components may not be fully dissolved, but may be emulsified or dispersed or in another form. This statement applies to components described herein as well as others not described.

A coating composition may be prepared by combining the bonding solution and a solid particulate metallic material, such as aluminum powder. Instead of or in addition to aluminum, other metal particles may be used, such as those disclosed in the above-referenced Allen patent. The coating composition may contain other components conventionally used in the coating industry, such as non-metallic pigments like alumina, zirconia, ceria, and/or other mixed metal oxides. The coated ferrous parts exhibit very satisfactory properties, generally equivalent or better than those achieved by the coatings described in the Allen and Stetson patents.

DETAILED DESCRIPTION

The aqueous bonding solution contains phosphoric acid, a source of magnesium ions, and a leachable corrosion inhibitor. The pH of bonding solution may be adjusted to the range of about 2 to about 4.5, usually from about 2.5 to about 3.5, and often from about 2.7 to about 3.3.

The bonding solution is stable, that is unreactive or substantially unreactive (or inert) to metallic (e.g., aluminum) particles added subsequently. In a reactivity test as described below, the coating composition exhibits no or essentially no visible reaction when aluminum particles are admixed to the bonding solution for at least up to one hour, often up to 4 hours, and in some instances up to 8 hours or more.

The magnesium ions in the bonding solution may be supplied by way of any convenient source such as in the form of magnesium carbonate, magnesium oxide or hydroxide, magnesium metal, or combinations thereof. The magnesium dissolves in the phosphoric acid forming the metal ions and water and/or gas. The amount added alone or in combination with the other compounds should be sufficient to bring the pH within the desired range or somewhat below or above the range so that upon addition of the other compound(s) the pH will be within the desired range.

Other suitable magnesium compounds which can serve as a suitable source of magnesium ions are listed in the Handbook of Chemistry and Physics, 87th Ed. CRC Press, Inc. Boca Raton, Fla., Editor David R. Lide, in the Chapter on Physical Constants of Inorganic Compounds ("Handbook"), which is incorporated herein by reference.

The bonding solution also includes one or more leachable corrosion inhibitors (sometimes also referred to as leachable pigments). The leachable corrosion inhibitor is capable of inhibiting or passivating the corrosion of the metal substrate. The leachable cation(s) may in some instances serve to passivate or stabilize the aluminum metal powder.

Pigments are often used in the paint industry to provide color or opacity, or to modify surface hardness, wetting properties, or other characteristics of polymer films. Pigments also may be used to provide corrosion resistance as barriers, e.g., flake-like pigments. As another example, anticorrosive pigments are selectively leached of specific ions or neutral compounds that alter the rate of corrosion of metallic substrates. For example, strontium chromate and zinc chromate leach small amounts of chromate ion, which effectively passivates most metals in neutral aqueous solutions. In general, such pigments are used only in porous primers which are topcoated with an effective barrier polymer film that seals and protects the primer from leaching except in those situations when the film is damaged or permeated.

Unlike paints, inorganic aluminum pigmented slurry coatings based on acidic phosphate binders have no organic carbon based polymer as the film former in the coating. The slurry coatings instead are water-based and are very porous yet they are often used without a topcoat or sealer. The addition of neutral modified phosphate pigments as corrosion inhibitors creates several unexpected improvements, such as (1) the pot life (mixed usable coating life) of the coating is extended significantly; (2) the chemical attack of the acid phosphate binder solution on steel substrates is reduced or eliminated; and (3) the performance of the applied aluminum coating under extreme conditions (salt spray, high temperature cycling, etc.) is enhanced. While it is not known specifically how these pigments are improving performance it is believed that small amounts of zinc, aluminum, and/or other ions are leached out of the coating after mixing and during exposure. The following table provides non-limiting examples of leachable corrosion inhibitors that may be used. These fall into the classification of metal orthophosphate or metal polyphosphate.

| Designation | Manufacturer | Chemical Name |
| --- | --- | --- |
| ZPA | Heubach | Zinc aluminum orthophosphate |
| ZAP | Wetech | Zinc aluminum tripolyphosphate |
| KWhite 105 | Tayca | Aluminum tripolyphosphate |
| ZAPP | Heubach | Zinc aluminum polyphosphate |
| SAPP | Heubach | Strontium aluminum polyphosphate |
| SRPP | Heubach | Modified strontium aluminum polyphosphate |
| ZCPP | Heubach | Modified zinc calcium polyphosphate |
| ZMP | Heubach | Zinc molybdate phosphate |

The concentration of the leachable corrosion inhibitor in the bonding solution may vary over a wide range depending on such factors as the identity of the leachable corrosion inhibitor, the identity and amount of other components present, and the targeted properties of the coating composition. For example, higher concentrations may be present in compositions that do not contain metal (e.g., aluminum) powder and/or where the leachable corrosion inhibitor is the only pigment present. By way of example, the amount of leachable corrosion inhibitor may range from about 2 to about 80 g, often from about 2 to about 50 g, per 100 ml of binder solution. In bonding solutions that are combined with aluminum powder, the amount of leachable corrosion inhibitor often ranges from about 2 to about 15 g per 100 ml of binder solution.

It often may be desirable to avoid the use of chromate salts in the leachable corrosion inhibitors due to environmental considerations. However, chromate salts may be present in the leachable corrosion inhibitors in applications where such use can be tolerated. The compositions may contain other compatible known ingredients such as surfactants, wetting agents and other conventional additives.

It was found compositions exhibiting satisfactory stability and performance characteristics can be prepared without the need for adding sources of zinc ions and/or aluminum ions as described in U.S. Pat. No. 5,478,413. Relatively small quantities of ions such as zinc and aluminum may be present in the aqueous compositions as a result of equilibrium reactions involving metals contained in the leachable corrosion inhibitor. The bonding solution may also contain quantities of other ions, such as calcium and/or strontium ions. In some instances the bonding solution is free or substantially free of Fe ions and/or Mn ions.

The composition may also contain borate ions, which may be supplied by any convenient form such as boron oxide, boric acid, and soluble borate salts. Non-limiting examples of borate compounds are listed in the Handbook. Boron oxide hydrates into boric acid and then reacts forming magnesium borate in solution.

The bonding solution may be prepared by first preparing a binder solution by combining water, phosphoric acid, a source of magnesium ions, and optionally a source of borate ions. The binder solution is buffered, e.g., to a pH of about 2 to about 3, often from about 2.4 to about 2.7. The leachable corrosion inhibitor may then be added to the buffered binder solution to prepare the bonding solution.

The coating slurry composition may be formed by mixing the above described bonding solution with the metal particles, e.g., aluminum particles in the form of powder, flake, or a combination thereof. The bonding solution is essentially inert with respect to any further reaction with the added aluminum. No visible reaction between the added aluminum particles and the phosphoric acid is apparent in the coating composition for at least one hour and in some instances for as long as eight hours or more.

The bonding solutions are particularly useful for forming coating compositions for ferrous metal alloy substrates when combined with particulate aluminum. Particulate aluminums suitable for use in such coating compositions are well known, and have been discussed at length in the patent literature. For example, such particulate aluminums are set forth in Mosser U.S. Pat. Nos. 4,537,632, 4,544,408, 4,548,646, 4,617,056, 4,659,613, and 4,863,516, which is particularly directed to the use of non-leafing aluminum flake in combination with atomized aluminum particles; and Mosser U.S. Pat. Nos. 4,889,558 and 5,116,672, all of which are incorporated herein by reference. A majority of chromate/phosphate based compositions that utilize aluminum particles use atomized and/or flaked particles of various sizes for coatings with different properties. These are of course also suitable for the present bonding and coating compositions.

When aluminum is used in the compositions it may be gas atomized spherical of an average size of 2.5-10 µm, air atomized of an average size of 4.5-10 µm, flake aluminum; flake/atomized mixtures; and aluminum alloys. Larger particles as well as smaller particles can be used.

The slurry coating compositions may be applied in a conventional way to the ferrous metal alloy surface to be coated. Manners of application are described in the patents referred to above and incorporated herein by reference. Generally, it is desirable to degrease the part to be coated, blast with aluminum oxide abrasive, and apply the coating by any suitable means, such as by spraying, brushing, dipping, dip spinning, etc., drying until the color of the coating turns grayish, curing the coating at a temperature of about 650° F. (343° C.) for 15 minutes or longer, curing at higher or lower temperatures if desired. The slurry is preferably applied in two coats or layers, each about 0.001 inch (25 µm) in thickness, then, if desired, dried at about 180° F. (82° C.) for 15 to 30 minutes and then cured at 650° F. (343° C.) for 30 to 60 minutes after each coat.

The coatings as cured at 650° F. (343° C.) are not electrically conductive and therefore can not provide galvanic protection against corrosion of the underlying substrate material. However, the coating may be made electrically conductive by burnishing with glass beads, abrasive media at low pressure or mechanically cold worked in other ways to produce a conductive sacrificial coating or by heating as specified in MIL-C-81751B specification (incorporated herein by reference). In this manner the coatings can, by mechanical or thermal processes, be made electrically conductive and thereby produce galvanic as well as barrier protection of the underlying ferrous alloy substrate. Desirably, after the second layer is applied, dried, cured and processed to make it electrically conductive, the surface of the coating may be sealed with a bonding solution (seal coat) to further increase the oxidation and corrosion protection provided by the coating, and to decrease the rate of consumption of aluminum in the coating during service. This bonding solution can but need not be a bonding solution as described herein. The seal coat may, in addition to having no additional fillers or pigments, contain pigments and fillers typical used in the industry. These include such materials as metal oxides such as alumina, silica, chromia, and titania, as well as mixed metal oxides and oxide spinels such as copper, iron and manganese chromite, and magnesium ferrite. The purpose of the pigments may be to increase oxidation and corrosion protection as well as provide improved application properties. The seal coats may be dried and cured at the same time and temperature as the above described slurry coatings.

As has been described above, it is often desirable to provide bonding and coating compositions which are essentially free of chromate, molybdate and other like toxic or undesirable metals. In situations where more permissive environmental conditions would permit the use of such metals as chromium, molybdenum, nickel and others, it is not excluded that such metals be used in the bonding and/or the coating composition. When chromium and/or molybdenum is present, the amount of chromium and/or molybdenum should be less than that necessary to passivate or neutralize the phosphoric acid solution to the reaction with metallic aluminum. The amount necessary to passivate the bonding solution as taught in the prior art generally is at least 0.2% by weight of the final coating composition.

In some applications it is desirable to apply a protective topcoat to the coated part, for example on turbine component surfaces which come into contact with the turbine gas path. Non-limiting examples of topcoats include compositions containing phosphate and nitrate ions as described in Myers et al. U.S. Pat. No. 5,968,240 and compositions containing phosphate and chromium III ($Cr^{3+}$) ions as described in Myers et al. U.S. Pat. No. 6,224,657, the disclosures of which are incorporated herein by reference.

The following Examples are merely illustrative and should not be construed as limiting the invention.

EXAMPLE 1

Binder

A binder for a bonding solution was prepared by combining deionized water, phosphoric acid, boron oxide, and magnesium carbonate in the amounts listed in the table below.

| | |
|---|---|
| Deionized Water | 2000 ml |
| 85% Phosphoric Acid | 332 ml |
| Boron oxide | 41.6 g |
| Magnesium Carbonate | 225 g |
| pH | 2.4-2.6 |

Bonding Solution

A bonding solution was prepared by mixing 100 ml of the binder with 4.2 g of Heucophos ZPA. The resulting pH of this bonding solution was 3.1.

Coating Composition

A coating composition was prepared by mixing 100 ml of the bonding solution with 70 g aluminum powder (5 μm).

EXAMPLES 2-9

Coating compositions were prepared in a manner described in Example 1 from bonding solutions which had the following compositions.

| | Binder Solution | | | | | Bonding Solution (per 100 ml binder solution) | | | |
|---|---|---|---|---|---|---|---|---|---|
| | | | | | | | KWhite | | |
| Ex. | $H_2O$ (ml) | $H_3PO_4$ (ml) | $B_2O_3$ (g) | $MgCO_3$ (g) | pH | ZPA (g) | 105 (g) | ZAPP (g) | pH |
| 2 | 2000 | 332 | 41.6 | 225 | 2.5 | 0 | 4.2 | 0 | 3.1 |
| 3 | 2000 | 332 | 41.6 | 225 | 2.5 | 0 | 0 | 4.2 | 3.2 |
| 4 | 2000 | 332 | 41.6 | 225 | 2.5 | 0 | 8.4 | 0 | 3.1 |
| 5 | 2000 | 332 | 41.6 | 225 | 2.5 | 0 | 0 | 8.4 | 3.1 |
| 6 | 2000 | 332 | 83.2 | 225 | 2.5 | 4.2 | 0 | 0 | 3.1 |
| 7 | 2000 | 332 | 0 | 225 | 2.5 | 4.2 | 0 | 0 | 3.2 |
| 8 | 2000 | 332 | 41.6 | 193 | 2.2 | 4.2 | 0 | 0 | 2.8 |
| 9 | 2000 | 332 | 41.6 | 225 | 2.5 | 8.4 | 0 | 0 | 3.3 |

COMPARATIVE EXAMPLES 1-4

Coating composition were prepared in a manner described in Example 1 from bonding solutions which had the following compositions.

| Comp. Ex. | $H_2O$ (ml) | $H_3PO_4$ (ml) | $B_2O_3$ (g) | $MgCO_3$ (g) | $MnSO_4$ (g) | Iron Pyrophosphate (g) | Zinc Oxide | ZPA (g) | pH |
|---|---|---|---|---|---|---|---|---|---|
| 1 | 2000 | 920 | 124* | 600 | 0 | 41 | 70 | 335 | 3.2 |
| 2 | 800 | 183.6 | 8.4 | 73.6 | 53.2 | 0 | 8.4 | 42.2 | 2.8 |
| 3 | 2000 | 332 | 41.6 | 225 | 0 | 0 | 0 | 0 | 2.5 |
| 4 | 2000 | 920 | 124* | 600 | 0 | 41 | 70 | 335 | 2.8 |

*added as boric acid

The coatings of Examples 1-9 and Comparative Examples 1-4 were tested for the following criteria:
1. Pot life/stability of the mixed coatings at room temperature.
2. Oxidation corrosion resistance. 3×4 inch panels with one coat, 0.8-1.0 mil thick (20-25 μm) were evaluated according to an industry standard oxidation corrosion test. Panels were bead burnished, heat treated at 700° F. (371° C.) for 23 hours, then at 1075° F. (579° C.) for 4 hours, scribed, and placed in a 5% salt spray per ASTM B117 for 400 hours.
3. Heat cycle salt spray. 4×4 inch panels with 2 coats, 2 cures, 1.5 mil (38 μm) thick, for 10 heat/salt spray cycles were evaluated where one cycle consisted of 7.5 hours at 850° F. (454° C.) and 15.5 hours in 5% salt spray. Coated panels were grit burnished and scribed prior to testing.

Test Procedure

Panels of 1010 mild steel were prepared by cutting 0.030 inch (0.75 mm) thick sheet stock and stamping each panel with a unique ID code. The panels were thermally degreased at 650° F. (343° C.) then grit blasted with 100 mesh alumina grit at 60 psi. An oxidation step consisting of 650° F. (343° C.) for one hour was performed prior to coating application.

Results

Pot Life/Stability

Table I provides the results of the pot life/stability observations for each coating. Comparative Example 3 had a very short pot life and showed signs of reaction with the substrate. This demonstrates the adverse effects in stability when a leachable corrosion inhibitor is not present.

TABLE I

| Example | Time to bubbling reaction (hr) | Sprayability time based On stirred viscosity (hr) |
|---|---|---|
| 1 | 7 | 24-48 |
| 2 | 2.5 | <24 |
| 3 | 4 | 30 |
| 4 | 3 | <24 |
| 5 | 7.5 | 48 |
| 6 | 8† | 120-144 |
| 7 | 2.5 | <24 |
| 8 | 3 | 120-144 |
| 9 | 120 | 144 |
| Comp. 1 | 7 | 24-48 |
| Comp. 2 | 2 | <24 |
| Comp. 3 | 0.25 | 1-3 |
| Comp. 4 | 3.5 | 96-120 |

†initial reaction occurred between 3 and 8 hours

Oxidation Corrosion Resistance

Panels coated with Examples 1 through 9, all of which are formulated according to the teachings of the invention, exhibited no red rust in the scribe and minimal sacrificial (white) corrosion products in the field (the coated area apart from the scribe). The coating of Comparative Example 3, which was formulated with no corrosion inhibitor, exhibited red rust in the scribe and significantly more sacrificial corrosion in the field than coatings of Ex. 1 to 9. This behavior demonstrates that a leachable corrosion inhibitor improves corrosion resistance of the cured coating as well as the pot life of the mixed coating as discussed above. Significant red rust was observed in the scribe of the panels coated with Comparative Example 2, demonstrating that the corrosion benefits of a leachable corrosion inhibitor can be eclipsed by other ions in the coating, e.g. manganese and sulfate.

Heat Cycle Salt Spray

The panels of Comparative Example 2 showed red rust in the field and in the scribe as early as 4 cycles into the test. After 5 cycles this coating began to delaminate in big pieces, particularly on the backs of the panel. All other specimens had some red rust in the scribe but no field rust, and some signs of sacrificial behavior (discoloration and white corrosion products). The panels of Example 4 had more corrosion in the scribe and at the upper edge than other panels. Coatings of Examples 1, 2, 3, 5, 6, 7, 8, and Comparative Examples 1, 3, and 4 were judged to have similar performance in this test.

While particular aspects have been described, it should be understood that the invention is not limited thereto since modifications may be made by persons skilled in the art. The present application contemplates any and all modifications that fall within the spirit and scope of the underlying invention disclosed and claimed herein.

What is claimed is:

1. An aqueous bonding solution prepared by a process comprising:
   (i) combining water, phosphoric acid, a source of magnesium ions, and optionally a source of borate ions to form a buffered binder solution;
   (ii) adding to the buffered binder solution a leachable corrosion inhibitor in an amount of from about 2 to about 15 g per 100 ml, wherein the leachable corrosion inhibitor is selected from the group consisting of zinc aluminum orthophosphate, zinc aluminum tripolyphosphate, aluminum tripolyphosphate, zinc aluminum polyphosphate, strontium aluminum polyphosphate, modified strontium aluminum polyphosphate, modified zinc calcium polyphosphate, zinc molybdate phosphate, and combinations thereof;
   wherein the bonding solution has a pH from about 2 to about 4.5 and is substantially free of zinc ions and aluminum ions in excess of quantities present from the leachable corrosion inhibitor.

2. The bonding solution of claim 1, wherein the source of borate ions is selected from the group consisting of boron oxide and boric acid.

3. The bonding solution of claim 1, wherein the source of magnesium ions is selected from the group consisting of magnesium oxide, magnesium carbonate, and a combination thereof.

4. The bonding solution of claim 1, wherein the leachable corrosion inhibitor is selected from the group consisting of zinc aluminum orthophosphate, zinc aluminum tripolyphosphate, aluminum tripolyphosphate, zinc aluminum polyphosphate, and combinations thereof.

5. The bonding solution of claim 1, wherein the solution is substantially free of chromate, molybdate, and vanadium ions.

6. The bonding solution of claim 1, wherein the solution is substantially free of hexavalent chromium ions.

7. The bonding solution of claim 1, wherein the solution has a pH from about 2.5 to about 3.5.

8. An aqueous phosphoric acid coating composition comprising the bonding solution of claim 1 and metallic particles.

9. The coating composition of claim 8 wherein the metallic particles comprise aluminum powder, aluminum flake, or a combination thereof.

10. A coating composition comprising (i) an aqueous bonding solution consisting essentially of phosphoric acid, a source of magnesium ions, optionally a source of borate ions, and a leachable corrosion inhibitor in an amount of from about 2 to about 15 g per 100 ml and (ii) and metallic particles, wherein the bonding solution has a pH from about 2 to about 4.5 and has an amount of hexavalent chromate ions which is less than that necessary to passivate or neutralize the bonding solution to reaction with the metallic particles, and wherein the bonding solution is substantially free of zinc ions and aluminum ions in excess of quantities present from the leachable corrosion inhibitor.

11. The coating composition of claim 10, wherein the source of borate ions is selected from the group consisting of boron oxide and boric acid.

12. The coating composition of claim 10, wherein the source of magnesium ions is selected from the group consisting of magnesium oxide, magnesium carbonate, and a combination thereof.

13. The coating composition of claim 10, wherein the leachable corrosion inhibitor is selected from the group consisting of zinc aluminum orthophosphate, zinc aluminum tripolyphosphate, aluminum tripolyphosphate, zinc aluminum polyphosphate, and combinations thereof.

14. The coating composition of claim 10, wherein the bonding solution is substantially free of chromate, molybdate, and vanadium ions.

15. The coating composition of claim 10, wherein the bonding solution is substantially free of hexavalent chromium ions.

* * * * *